Feb. 9, 1954   H. C. PAINE   2,668,467
LATHE TOOL JACK
Filed Oct. 27, 1950

Harry C. Paine
INVENTOR.

BY

Patented Feb. 9, 1954

2,668,467

UNITED STATES PATENT OFFICE 2,668,467

LATHE TOOL JACK

Harry C. Paine, California, Pa.

Application October 27, 1950, Serial No. 192,448

1 Claim. (Cl. 82—36)

This invention relates to lathes and more particularly to an improvement in means for supporting and fixedly holding a cutting tool on the lathe tool head during operation of the lathe.

It is a principal object of the invention to provide a tool jack that will be readily attached or detached from the lathe tool or lathe tool holder.

Another object is to provide a tool jack which is easily and quickly placed into position to hold the tool firmly during operation of the lathe. To this end, it is preferred to make the body of the jack out of permanently magnetized material or at least a portion of the jack so that the same will readily attach itself to the tool and can be easily manipulated and positioned so as to accomplish the purpose desired.

Still another object is to provide a tool jack as described which is adjustable in height and wherein the tool can be kept on a center line whereby the tool will be held in proper position for operation.

The above objects and advantages attained by the invention, as well as others which will become apparent from the following description, are especially useful when using a cutting-off tool in the conventional manner. In such a case, one is at a disadvantage owing to the necessary overhang of the tool between the post and the end of the tool, and particularly in the case of small lathes.

Utilizing the tool jack for supporting a tool near its working end in accordance with the present invention, this disadvantage is overcome for all practical purposes, and the tendency of the tool to spring and chatter is prevented and, further, by making the tool jack out of a permanent magnet, or at least the head portion, it is readily attached and detached from the tool and can be easily and quickly adjusted into position to hold the tool firmly.

A preferred embodiment of the invention has been illustrated by way of example only in the accompanying drawings, wherein.

Figure 1:
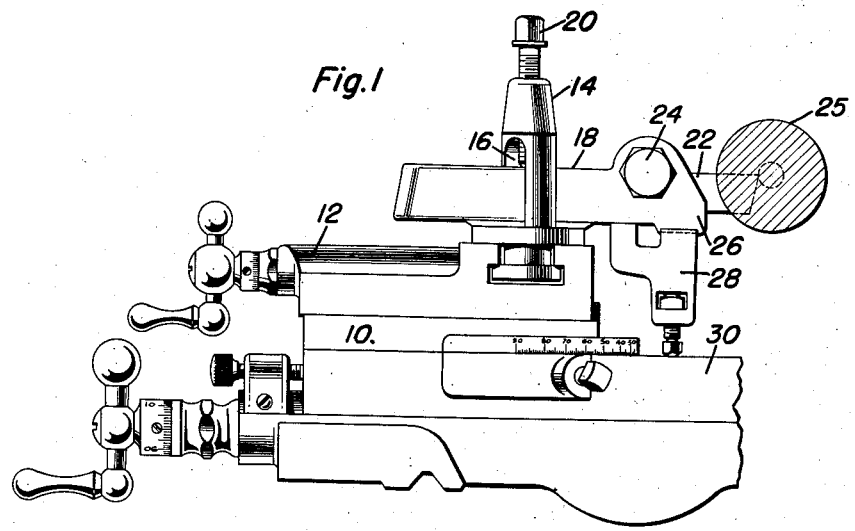
Figure 1 is an elevational view of a lathe, shown partly broken away, and illustrating a tool jack constructed in accordance with the present invention arranged in position for supporting a cutting tool.

Referring now more particularly to the accompanying drawings, wherein like numerals designate similar parts throughout the various views, it will be seen by reference to Figure 1 that the numeral 10 designates a lathe of conventional design which is provided with a movable head member 12 upon which a tool post 14 is rotatably mounted. This post is slotted vertically, as at 16, to receive a cutting-off tool holder member 18, which is clamped to the post by means of a set screw 20. A tool in the form of a cutting blade 22 is removably attached to the holder 18 by means of a stud bolt 24, the blade being shown in position to perform a cutting operation on the work piece 25.

The foregoing structure, as aforementioned, is conventional in lathe machines, and to which the tool jack devised according to the present invention is adapted to be attached and utilized to provide for improved operation of the lathe. The position of the tool jack for firmly supporting the over-hanging end portion 26 of the tool holder 18 is illustrated in Figure 1, the same being adjustably positioned between the tool holder portion 26 and body of the lathe bed, as at 30.

Figure 2:
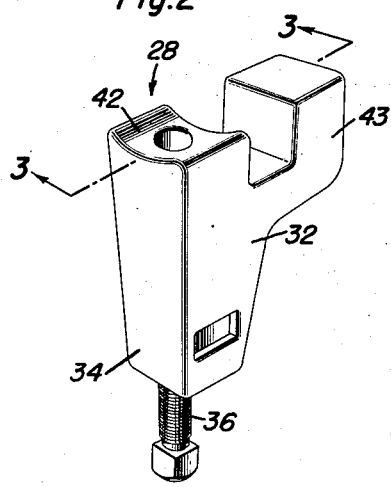
Figure 2 is a view in perspective illustrating the preferred form of the tool jack.
Figure 3:
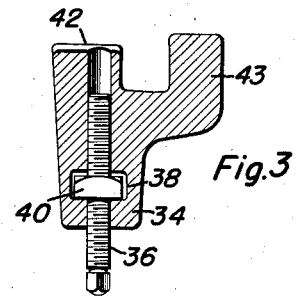
Figure 3 is a vertical section taken substantially along a plane indicated by the line 3—3 on Figure 2 and looking in the direction of the arrows.

Referring to Figures 2 and 3, a preferred form of tool jack is illustrated which comprises a metallic member 32 which includes an elongated vertical bar or body portion 34. To raise and lower the member 32 and vary the length or height of the jack, a screw 36 is provided, the member 32 having a vertical bore therethrough accommodating said screw, as shown in Figure 3. A recess 38 is provided in the member 32 to receive a nut 40 on the screw 36. This set screw is preferably arranged to pass through the body portion 34, as illustrated in Figures 2 and 3, and assist in accurately positioning the tool jack relative to the tool holder. To provide a substantially self-aligning surface for receiving the tool holder, the upper surface of the body portion 34, which forms a shoulder for abutting against the under side of the tool member 26, is of a concave shape to provide a seat, as illustrated at 42 in Figure 2. The adjacent integral shoulder portion or angular arm 43, as shown, is preferably provided with a plane surface for receiving the under flat portion of the tool holder 18 as illustrated in Figure 1.

It will be readily appreciated that by making the tool jack body portion 32 of magnetic material and utilizing a removable set screw arrangement as shown for varying the height of the jack, a jack which is easily assembled and disassembled is provided. Further, employing the novel construction as shown, when the nut and set screw have become worn, the same may be readily replaced and the jack body portion 32 continued in use.

While the tool jack body portion 32 is preferably made of magnetic material for simplicity and economic reasons, it, if course, will be understood that if desired an electromagnetic portion may be utilized for the same purpose.

Figure 4:
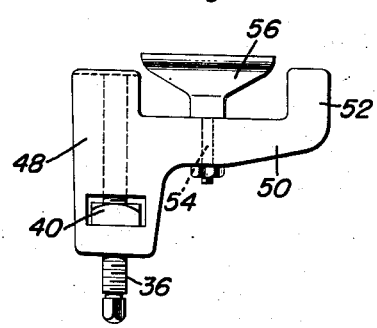
Figure 4 is an elevational view illustrating a modified tool jack construction wherein a suction cup is mounted on the jack for holding the same on the tool.

As an alternative arrangement, the tool jack may be provided with suction or vacuum cup means to hold the jack on the tool holder. Such a modified construction is illustrated in Figure 4, wherein a tool jack body 48 comprises an elongated integral portion 50 and shoulder support 52. Suitably mounted on the body portion 50, as by means of a bolt 54, is a vacuum cup 56 which is of such size and shape to engage the tool holder and hold the same thereto. In place of a single vacuum cup, a plurality of smaller cups may, of course, be used.

From the foregoing, the construction and operation of the tool jack will be readily understood, and further explanation is believed to be unnecessary.

Obvious modifications and changes will readily occur to those skilled in the art after a consideration of the foregoing specification and accompanying drawings, and it is thus not desired to limit the invention to the exact construction shown and described, but all suitable modifications and equivalents may be resorted to, falling within the scope of the appended claim.

Having described the invention, what is claimed as new is:

A lathe tool holder jack comprising, a vertical magnetized bar engageable beneath the outer end portion of the holder and including a seat on its upper end for the reception of said holder, said bar having a vertical bore therein and further having a transverse recess therethrough intersecting the bore, a nut mounted in the recess, a screw threadedly mounted for vertical adjustment in the nut and operable in the bore, said screw being engageable with the lathe for raising and lowering the bar, and an angular arm integral with the bar and engageable beneath the holder at a point in spaced relation to said bar.

HARRY C. PAINE.

References Cited in the file of this patent

UNITED STATES PATENTS

| Number | Name | Date |
|---|---|---|
| 804,067 | Stowe | Nov. 7, 1905 |
| 1,187,099 | Rogers | June 13, 1916 |
| 1,778,494 | Gronwald | Oct. 14, 1930 |

FOREIGN PATENTS

| Number | Country | Date |
|---|---|---|
| 522,968 | Great Britain | July 2, 1940 |